United States Patent [19]

Iwase et al.

[11] Patent Number: 4,907,092
[45] Date of Patent: Mar. 6, 1990

[54] MODULATING/DEMODULATING CIRCUIT FOR MULTIPLEX RECORDING/PLAYBACK OF DATA IN A MAGNETIC RECORDING/PLAYBACK SYSTEM

[75] Inventors: Yoshiki Iwase; Katsuo Nakadai, both of Tokyo; Izumi Miyake; Kiyotaka Kaneko, both of Kawasaki; Kazuya Oda, Tokyo, all of Japan

[73] Assignee: Fuji Photo Film Co., Ltd., Kanagawa, Japan

[21] Appl. No.: 250,368

[22] Filed: Sep. 28, 1988

Related U.S. Application Data

[62] Division of Ser. No. 29,231, Mar. 23, 1987, Pat. No. 4,804,925.

[30] Foreign Application Priority Data

Mar. 26, 1986 [JP] Japan .................................. 61-65961
Mar. 26, 1986 [JP] Japan .................................. 61-65962

[51] Int. Cl.⁴ .............................................. H04N 5/76
[52] U.S. Cl. ..................................... 358/335; 358/909; 360/29; 360/18; 329/311; 329/358
[58] Field of Search .................. 358/310, 335, 23, 330, 358/909; 329/50, 104, 137, 145, 110; 375/82, 84, 94; 360/18, 29, 40, 35.1

[56] References Cited

U.S. PATENT DOCUMENTS 4,628,271 12/1986 Takayama ........................ 329/137 X Primary Examiner—Robert L. Richardson
Attorney, Agent, or Firm—Birch, Stewart, Kolasch & Birch

[57] ABSTRACT

A data signal is modulated by an exclusive-OR operation applied to a carrier signal and a data signal to be recorded. Demodulation is similarly performed by an exclusive-OR operation applied to the carrier signal and signal indicative of read data. This makes it possible to construct the modulating/demodulating circuit in the form of a digital circuit.

6 Claims, 6 Drawing Sheets

```
                    ┌── INITIAL BIT
DATA TO BE          ▼
   RECORDED(I)  0  0  1  0  1  1  0  1  1  0  0  1

DIFFERENTIAL DATA   1  0  1  1  1  0  1  1  0  1  0  1
```

MODULATING/DEMODULATING CIRCUIT FOR MULTIPLEX RECORDING/PLAYBACK OF DATA IN A MAGNETIC RECORDING/PLAYBACK SYSTEM

This application is a divisional of copending application Ser. No. 07/029,231, filed on Mar. 23, 1987, and now U.S. Pat. No. 4,804,925.

BACKGROUND OF THE INVENTION

This invention relates to a modulating/demodulating circuit in a magnetic recording/playback system of the type in which a frequency-modulated still video signal is recorded on a rotating magnetic disk by a magnetic head or a still video signal is read from the magnetic disk and played back, wherein the modulating-/demodulating circuit is used to superimpose data other than a still video signal on a video signal and write the data onto the magnetic disk, or read the data from the magnetic disk, by means of frequency multiplexing.

Electronic still video camera systems have recently been developed. These systems combine an imaging device such as a solid state imaging element or image pickup tube with a recorder that employs an inexpensive magnetic disk of a comparatively large storage capacity as a storage medium and operates by electronically imaging a subject, recording a still picture of the subject on the magnetic disk and reproducing the recorded picture by a separately provided television system or printer. A still video signal magnetic recording system in which a still picture recorded on a visible recording medium such as ordinary film or photographic paper is imaged and recorded on a magnetic disk has also been realized.

Recording a still video signal on a magnetic disk is performed by frequency modulating the video signal over a wide frequency range on the order of 10 MHz and using a comparatively high frequency. It is possible to avoid utilizing certain comparatively low frequencies (e.g. on the order of 200 kHz) to allow their use for the sake of recording data other than video signals. In accordance with the format standards used in this industry, the recording of various data on magnetic disks by frequency multiplexing using such low frequencies is allowed.

An example of a modulating method which can be used to record such data is differential phase shift keying (DPSK), the details of which will be described below. An example of a known modulating/demodulating circuit which operates based on this modulating method is a circuit using an analog-type phase lock loop (PLL), as disclosed, for example, in the specification of Japanese Utility Model Application Laid-Open Publication No. 59-164918. A problem with this conventional modulating/demodulating circuit is that since analog means are used, it is difficult to determine and adjust the circuit constants. Another problem stemming from the analog approach is that the circuitry is of a comparatively complicated construction.

SUMMARY OF THE INVENTION

An object of the present invention is to solve the aforementioned problems by digitalizing the modulating/demodulating circuit for multiplexed recording/playback of data.

Another object of the present invention is to provide a DPSK demodulating circuit the circuitry of which is simply constructed.

In accordance with the present invention, the first-mentioned object is attained by providing a modulating/demodulating circuit for multiplexed recording/playback of data in a magnetic recording/playback system, which circuit comprises a carrier signal generating circuit for generating a carrier signal for multiplexed recording/playback of data, and an exclusive-OR circuit to which are inputted a signal representing data to be recorded, or a data read signal read from a magnetic storage medium, and the abovementioned carrier signal.

Thus, in accordance with the invention, the modulating/demodulating circuit is put in digital form, thereby achieving a comparative simplification in circuit construction and almost dispensing with the need to make circuit adjustments. The fact that no analog components are necessary greatly reduces the need to consider, and to compensate for, temperature characteristics. Moreover, the invention makes it feasible to readily apply IC techniques to the modulating/demodulating circuit, with an attendant reduction in cost. Digitalizing the circuit makes it easier to interface with a computer, especially a microcomputer.

The second object of the invention is attained by providing a DPSK demodulating circuit comprising a carrier signal generating circuit for generating a carrier signal for DPSK demodulation, and an exclusive-OR circuit to which are inputted a signal modulated by data and the abovementioned carrier signal. The carrier signal generating circuit includes an edge sampling circuit for sampling leading and trailing edges of the modulated signal, a converting circuit for converting an output pulse signal from the edge sampling circuit into a rectangular signal having the same period of the output pulse signal and duty factor of one-half, and a frequency dividing circuit for doubling the period of an output signal from the converting circuit.

In accordance with the invention, the carrier signal generating circuit forms the carrier signal by using a modulated signal, namely a signal to be demodulated. Therefore, regardless of a phase shift attributed to the data, it is possible to obtain a carrier signal the leading or trailing edge of which is synchronized to the leading or trailing edge of the modulated signal, and it is unnecessary to provide a separate carrier signal oscillator circuit.

These and other features of the present invention will become clear from a description of preferred embodiments with reference to the accompanying drawings.

DESCRIPTION OF THE PREFERRED EMBODIMENTS

Figures 1, 2:
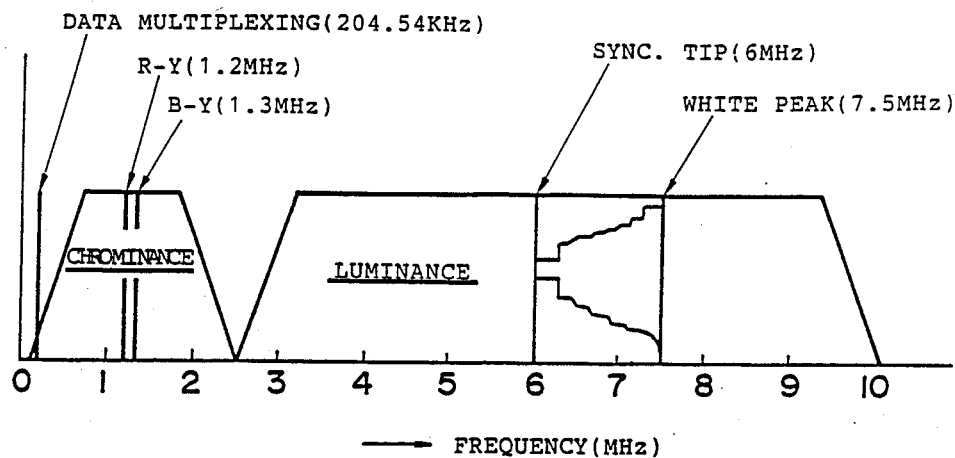
FIG. 1 is a view illustrating the frequency spectrum of a still video signal recorded on a magnetic disk and of a data record signal.
FIG. 2 is a view illustrating the manner in which data to be recorded are converted into differential data.

FIG. 1 illustrates the frequency spectrum of a frequency-modulated color still video signal recorded on or played back from a magnetic disk. A chrominance signal and luminance signal are distributed over a wide frequency range on the order of 10 MHz. The frequency $f_c$ of a carrier signal of a signal for multiplex recording of data through superposition on a still video signal by frequency multiplexing is set at 204.54 kHz ($=13f_h$, where $f_h$ is the horizontal scanning frequency) in accordance with the format standard.

The data format of the data in data multiplexed recording has also been established. The format comprises an initial bit (one bit), field/frame data (two bits), track address data (seven bits), data indicative of day, month and year (19 bits), and data employed by the user (27 bits). In a still video recording/playback system capable of recording a frame, the recording of field/frame data for the purpose of distinguishing whether a stored still video signal is indicative of a frame or field is essential. The data employed by the user are necessary to enable the user to control the system and for other purposes.

The DPSK method as the abovementioned modulating method will now be described.

FIG. 2 illustrates a series of data to be recorded, such as the abovementioned initial bit, field/frame data, track address data and the like. If there is a change from one bit to the next in this series of data (e.g. if a bit changes from 1 to 0 or from 0 to 1), a corresponding bit of differential data is assigned a value of 1. If a bit does not change in the series of data to be recorded, a corresponding bit of differential data is assigned a value of 0. The differential data thus prepared are shown in the lower half of FIG. 2.

Figure 3:
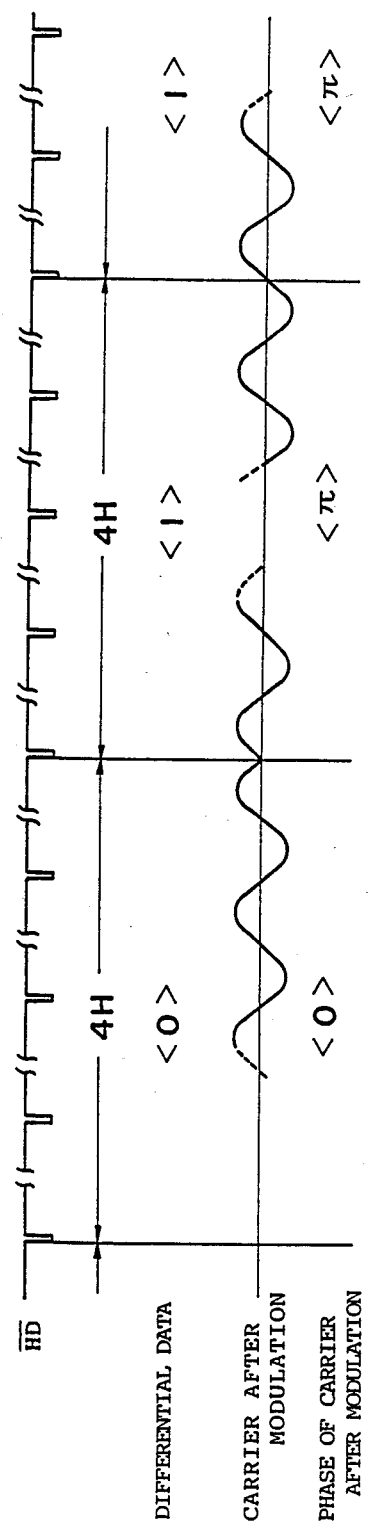
FIG. 3 is a waveform diagram illustrating the manner in which phase shift modulation of a carrier is performed by a DPSK system.

A carrier (frequency $f_c = 13f_h$) is phase-shift modulated between two phases (0 and $\pi$) by such differential data, as depicted in FIG. 3. In other words, the phase of the carrier is made 0 if a differential data bit is 0 and $\pi$ if the differential data bit is 1.

In principle, the bit rate of the differential data is taken to be one bit in the interval 4H (where H represents the interval between horizontal synchronizing pulses). More specifically, the phase of the carrier is changed in dependence upon the differential data at intervals of 4H. (This includes cases where, if the differential data is the same, the phase is also the same.) It should be noted, however, that the bit rate can be made one bit in an interval of 2H where user data are concerned, in accordance with the format standard.

FIG. 3 illustrates a case where the differential data are . . . 011 . . . , with $\overline{HD}$ representing a signal synchronized to the horizontal synchronizing signal. In the illustrated carrier waveform, the frequency is shown in enlarged form only at locations where the phase is shifted. The carrier waveform at other locations is not shown.

Figure 4:
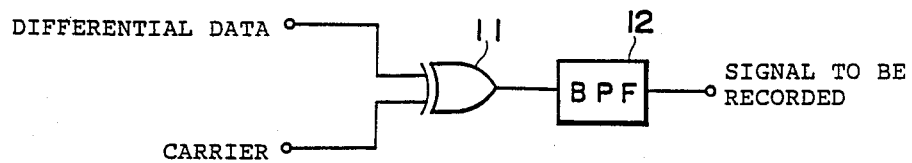
FIG. 4 is a circuit diagram showing the principle of a modulating circuit according to the present invention.
Figure 5:
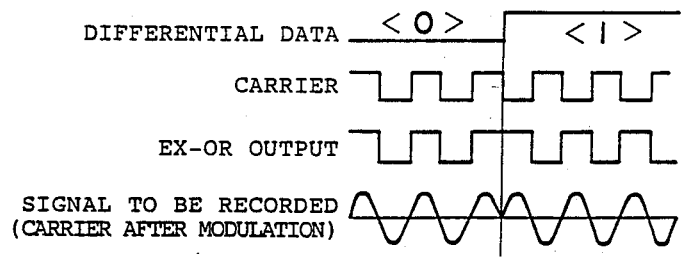
FIG. 5 is a waveform diagram illustrating the operation of the circuit of FIG. 4.

FIG. 4 shows the basic construction of a modulating circuit according to the present invention, and FIG. 5 illustrates the waveforms of various input and output signals of the circuit shown in FIG. 4.

The modulating circuit of FIG. 4 comprises an exclusive-OR (ex-OR) circuit 11 and a band-pass filter (BPF) 12. Since the differential data signal represents changes in the data to be recorded (which data shall be referred to as "recording data" where appropriate), the differential data signal can readily be obtained from a signal representing the recording data by known simple logic circuits. The differential data signal is applied to one input terminal of the ex-OR circuit 11, and the aforementioned carrier signal of frequency $f_c$ is applied to the other input terminal of the ex-OR circuit 11. The carrier signal, which is a rectangular-wave signal or pulsed signal, can be obtained from an appropriate carrier wave signal generating circuit, not shown.

As a result of taking the ex-OR of the differential signal and carrier signal, the phase of the carrier signal is shifted by $\pi$ when a bit of the differential data undergoes an inversion. The output of the ex-OR circuit 11 is delivered to the BPF 12, which is adapted to pass only frequency signal components in the vicinity of the carrier signal frequency $f_c$. Thus, the BPF 12 functions to convert the ex-OR output into a smoothly changing recording signal.

The data recording signal is combined with a video signal, namely chrominance and luminance signals, and is recorded on a predetermined track of a magnetic disk by a magnetic head.

Playback of the data signal is achieved in the same fashion, specifically by demodulating a data signal, which has been read from the magnetic disk, through use of an ex-OR circuit. More specifically, the signal read from the magnetic disk by the magnetic head is passed through a band-pass filter the center frequency of which is the carrier signal frequency $f_c$, whereby a video signal is separated from the read signal to obtain the modulated carrier signal of the data. The modulated carrier signal is waveshaped and applied to the ex-OR circuit together with the carrier signal. It will be readily understood from FIG. 5 that a signal representing the differential data is obtained from the output side of the ex-OR circuit. The conversion from differential data to data can also be performed by a simple logic circuit.

Figure 6:
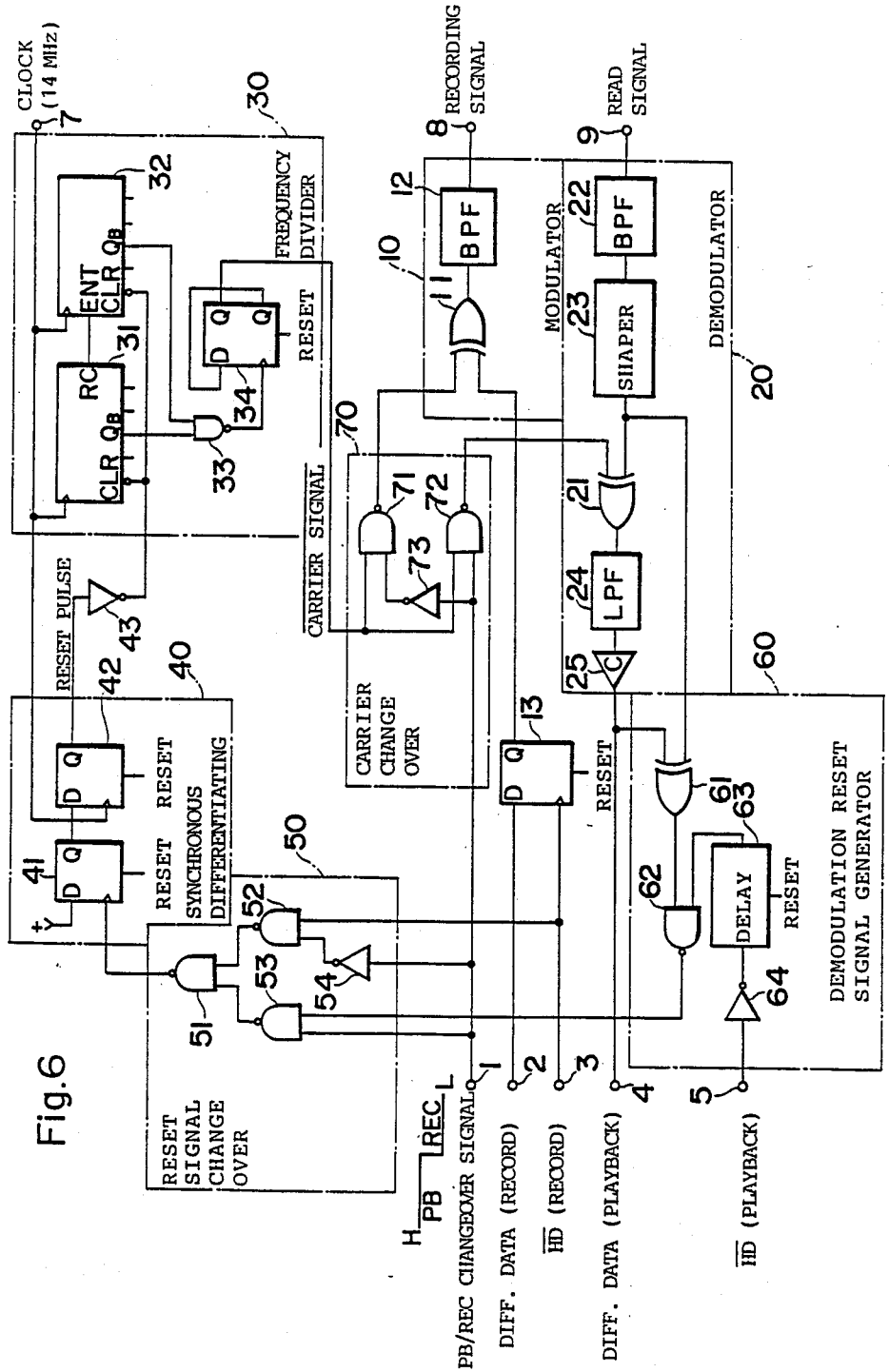
FIG. 6 is a circuit diagram illustrating a detailed embodiment of the invention.

FIG. 6 illustrates a modulating/demodulating apparatus, assembled upon taking various timings into consideration, based on the basic approach to modulation and demodulation described above.

The apparatus of FIG. 6 has a modulating circuit 10 that includes the ex-OR circuit 11 and band-pass filter 12 shown in FIG. 4. The circuit 10 produces an output signal, namely a data recording signal which has been modulated, and applies the signal to an output terminal 8. The signal at terminal 8 is delivered to a mixing circuit (not shown), where the signal is mixed with a still video signal. The resulting signal is recorded on a magnetic disk by a magnetic head.

In the playback mode, the signal read from the magnetic disk read by the magnetic head enters from an input terminal 9 and is applied to a band-pass filter 22 the center frequency of which is the carrier frequency $f_c$. Here the signal modulated by the differential data is separated from the still video signal. The differential data-modulated read signal has its waveform shaped by a waveform shaping circuit 23 before being applied to an ex-OR circuit 21, where demodulation is performed to obtain the differential data signal, as described above. This signal is applied to a low-pass filter 24 for removal of so-called "spikes" and other noise, and then to a comparator circuit 25, where the signal has its waveform shaped before being applied to a differential data signal output terminal 4.

A signal for changing over between the playback (PB) mode and recording (Rec) mode is applied to an input terminal 1. This signal assumes the H level when the playback mode is to be established, and the L level when the recording mode is established, as shown above the input terminal 1. This switching signal is delivered to a reset signal changeover circuit 50 and a carrier changeover circuit 70.

The carrier signal of frequency $f_c$ is generated by a frequency divider circuit 30. The latter comprises counters 31, 32, a NAND circuit 33, the inputs to which are predetermined count outputs from these counters, and a D-type flip-flop 34 having a clock input terminal to which the output of the NAND circuit 33 is fed and a data input terminal to which the inverted output of the flip-flop is fed back. The frequency divider circuit 30 counts down clock pulses received from an input terminal 7 at a frequency of about 14 MHz, thereby generating an inverted version of the aforementioned carrier signal having the frequency $13f_h$. In order to obtain synchronization between the carrier signal and another signal, e.g. the differential data signal, the counters 31, 32 of the frequency divider circuit 30 are reset every horizontal scanning interval by a reset pulse, received from a synchronous differentiating circuit 40, described below, via a NOT circuit 43. Reset timing differs for the recording mode and playback mode, as will be described below. Once reset, the counters 31, 32 resume counting from 1.

The inverted carrier signal generated by the frequency divider circuit 30 is applied to a carrier changeover circuit 70. The latter functions to supply the carrier signal to the ex-OR circuit 11 of modulating circuit 10 in the recording mode and to the ex-OR circuit 21 of the demodulating circuit 20 in the playback mode. Specifically, the circuit 70 includes a NAND gate 71 controlled by the playback/record changeover signal following its inversion by a NOT circuit 73, and a NAND gate 72 controlled by the uninverted playback/record changeover signal. In the recording mode, the changeover signal is at the L level, so that a high-level control signal is applied to the NAND gate 71. As a result, the inverted carrier wave signal applied to the other input terminal of NAND gate 71 is re-inverted by the NAND gate and then applied to one input terminal of the ex-OR circuit 11 of modulating circuit 10. Conversely, in the playback mode, the H-level changeover signal is applied to the NAND gate 72, so that the inverted carrier signal is inverted by the NAND gate 72 and then applied to one input terminal of the ex-OR circuit 21 of demodulating circuit 20.

Similarly, the reset signal changeover circuit 50 includes a NAND gate 52 controlled by the playback/record changeover signal following its inversion by a NOT circuit 54, and a NAND gate 53 controlled by the uninverted playback/record changeover signal. The circuit 50 further includes a NAND gate 51 for taking the NAND of the output signals from the NAND gates 52, 53. In the recording mode, therefore, an inverted signal $\overline{HD}$, which is synchronized to the horizonal synchronizing signal and applied to an input terminal 3, enters the synchronous differentiating circuit 40 through the NAND gates 52, 51. In the playback mode, a reset signal generated by a reset signal generating circuit 60 (described below) for demodulation purposes is applied to the synchronous differentiating circuit 40 through the NAND gates 53, 51.

The synchronous differentiating circuit 40 includes two D-type flip-flops 41, 42. The output signal of the reset signal changeover circuit 50 is applied to the clock input terminal of flip-flop 41, whose uninverted output is applied to the data input terminal of the other flip-flop 42, and the approximate 14 MHz clock signal is applied to the clock input terminal of flip-flop 42. When the reset signal from the changeover circuit 50 is inputted to the differentiating circuit 40, a reset pulse having a very small pulse width (e.g. 70 ns) synchronized to the 14 MHz clock signal appears at the uninverted output terminal of the flip-flop 42 and is applied to clear input terminals of the counters 31, 32 in frequency divider circuit 30 via a NOT circuit 43.

Figure 7:
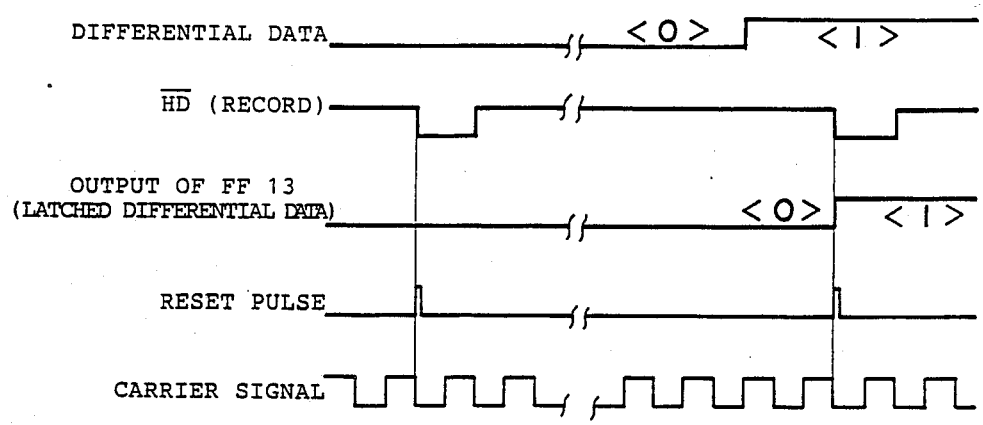
FIGS. 7 and 8 are waveform diagrams illustrating the operation of the circuit of FIG. 6.

Modulation timing in the recording mode will now be described with reference to FIG. 7.

The differential data to be recorded enter at an input terminal 2 and are applied to the data input terminal of a D-type flip-flop 13. Inputted to the clock input terminal of the flip-flop 13 is the inverted signal $\overline{HD}$ synchronized to the horizontal synchronizing signal in the recording mode. Accordingly, the differential data are latched by the flip-flop 13 at a timing decided by the signal $\overline{HD}$. Further, the reset pulses from the synchronous differentiating circuit 40 are applied to the frequency divider circuit 30 at a timing decided by the signal $\overline{HD}$. As a result, the frequency divider circuit 30 outputs the carrier signal accurately synchronized to the signal $\overline{HD}$ at all times.

As set forth earlier, the carrier signal is applied to one input terminal of the ex-OR circuit 11 in the recording mode, and the uninverted output of flip-flop 13 representing the latched output of the differential data is applied to the other input terminal of the ex-OR circuit 11. Accordingly, the phase of the carrier signal is inverted (shifted) at a timing synchronized to the signal $\overline{HD}$. (It should be noted that this phase shift of the carrier signal will take place providing that there has been a change in the differential data, as pointed out earlier.)

In the playback mode, the resetting of the counters 31, 32 in frequency divider circuit 30 for obtaining synchronization between the carrier signal and the signal indicative of the read data is performed near the approximate center of the inverted signal $\overline{HD}$ (i.e. near the approximate center of the H-level portion) synchronized to the horizontal synchronizing signal when the playback mode is in effect. The reason for this is to prevent erroneous demodulation which might otherwise occur because of the fact that a phase shift included in the signal indicative of the read differential data occurs near the signal $\overline{HD}$ (i.e. near the L-level portion of $\overline{HD}$).

Figure 8:
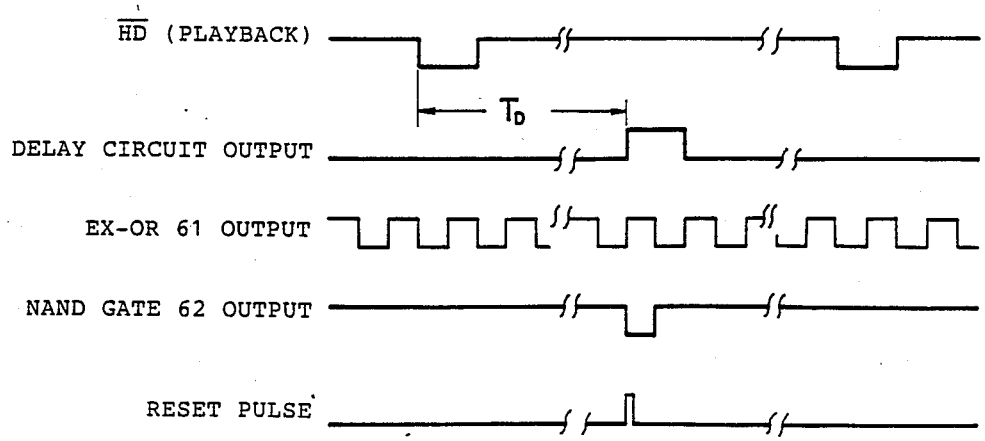

In the reset signal generating circuit 60 for demodulation, the signal $\overline{HD}$ is applied at an input terminal 5. The signal $\overline{HD}$ is inverted by a NOT circuit 64 and delayed by a time period that is approximately one-half the horizonal scanning interval H (see FIG. 8). The delayed signal is applied to a NAND gate 62.

The output of the comparator circuit 25 following demodulation and the output of the waveform shaping circuit 23 prior to demodulation are inputted to an ex-OR circuit 61. As a result, a carrier signal for demodulation having the same phase at all times is obtained from the ex-OR circuit 61 regardless of the fact that the output of the waveform shaping circuit 23 has a portion shifted in phase by $\pi$ due to the phase modulation (phase shift). This carrier signal is inputted to the NAND gate 62. Accordingly, the NAND gate 62 outputs a reset timing signal near the approximate center of the signal $\overline{HD}$ (i.e. near the approximate center of the H-level portion). This signal is delivered to the synchronous differentiating circuit 40 through the reset signal changeover circuit 50, so that the circuit 40 outputs a pulse synchronized to this signal, thereby resetting the counters 31, 32 of the frequency divider circuit 30. As a result, the carrier signal has its leading edge brought into precise coincidence with the leading or trailing edge of the signal indicative of the read differential data so that accurate demodulation is achieved.

Figure 9:
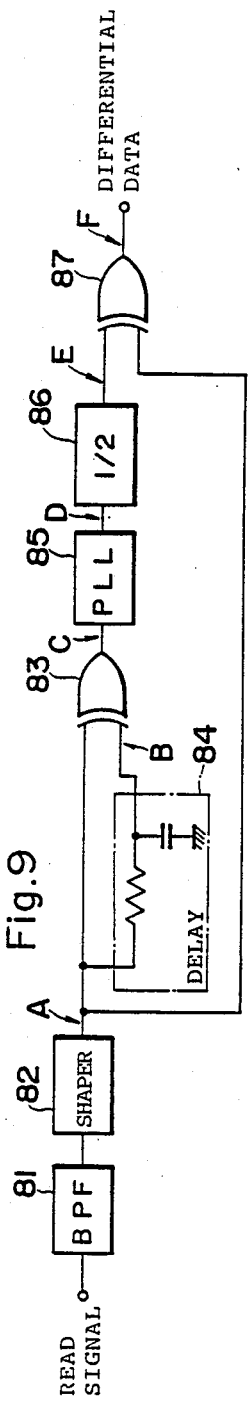
FIG. 9 is a circuit diagram illustrating another embodiment of the invention.
Figure 10:
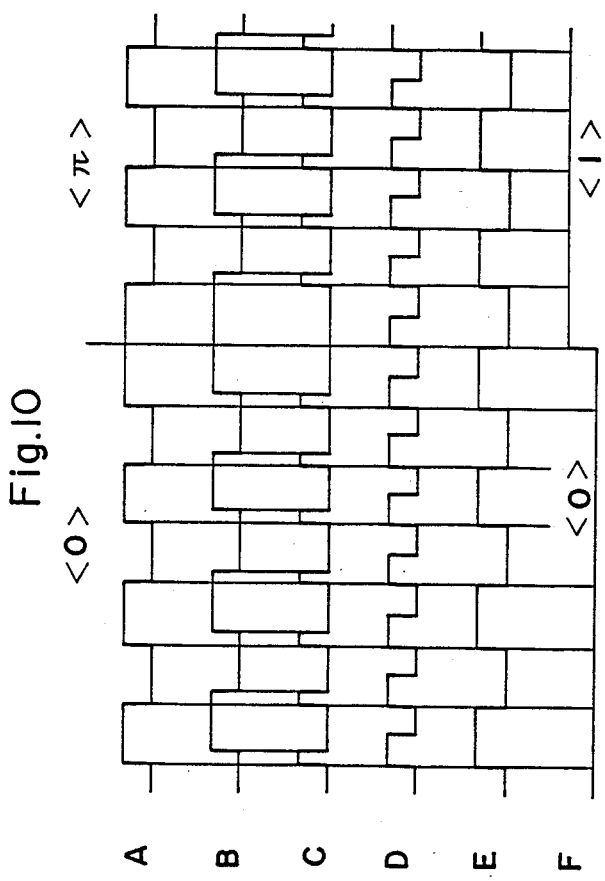
FIG. 10 is a waveform diagram illustrating the operation of the circuit of FIG. 9.

FIGS. 9 and 10 illustrate another embodiment of the present invention, in which FIG. 9 shows a simplified DPSK demodulating circuit, and FIG. 10 depicts output signal waveforms obtained from blocks of this circuit.

It is evident from the above-described embodiment that the most important factor in demodulation using the ex-OR circuit is generation of a carrier signal for demodulation that is in correct synchronization with the carrier signal modulated by the data. Since the carrier signal modulated as set forth above possesses a 0 or $\pi$ phase in dependence upon the data, the carrier signal for demodulation is not, in the strict sense, synchronized to the modulated carrier signal. However, the timing of the leading edge of the carrier signal for demodulation must coincide with the leading edge (if the phase is 0) or trailing edge (if the phase is $\pi$) of the modulated carrier signal.

The embodiment of FIGS. 9 and 10 is primarily directed to the question of how to produce a carrier signal for demodulation that has a leading edge coinciding with the leading or trailing edge of a modulated carrier signal.

With reference to FIGS. 9 and 10, a signal read from a magnetic disk is inputted to a band-pass filter 81 the center frequency of which is the carrier signal frequency $f_c$. Here a high-frequency frequency-modulated still video signal component is separated from the carrier signal to extract a carrier signal modulated by the differential data. This differential data signal has its waveform shaped by a waveform shaping circuit 82, whereby a rectangular wave signal A is obtained. Since the signal A is phase-shift modulated by the differential data, the phase of the signal is 0 when the differential data is 0 (refer to the demodulated differential data signal F) and $\pi$ when the phase of the differential data is 1.

The modulated carrier signal A is delivered to one input terminal of an ex-OR circuit 87 for demodulation and one input terminal of another ex-OR circuit 83, and is inputted to a delay circuit 84. The delay circuit 84 delays the input signal only slightly and delivers its output B to the other input terminal of the ex-OR circuit 83.

Since the ex-OR circuit 83 takes the exclusive-OR of the modulated carrier signal A and the slightly delayed signal B, both the leading edge and the trailing edge of the signal A are sampled, whereby there is obtained a pulse signal C having a frequency $26f_h$, which is twice the frequency of the carrier signal $f_c$. It should be noted that the pulse signal C can also be obtained by using a double-edge differentiating circuit instead of the combination of the ex-OR circuit 83 and delay circuit 84.

The pulse signal C is delivered to a phase locked loop (PLL) circuit 85, the frequency of which is locked at $26f_h$. In general, the PLL is composed of a phase comparator, a low-pass filter and a voltage-controlled oscillator circuit. A rectangular wave signal D having a frequency of $26f_h$ and duty factor of one-half is obtained from the voltage-controlled oscillator circuit of the PLL fixed at the frequency of $26f_h$.

The rectangular wave signal D is inputted to a ½ frequency divider circuit 86, which halves the frequency of the signal D, thereby converting it into a carrier signal having a frequency of $13f_h$. The carrier signal E is inputted to the other input terminal of the ex-OR circuit 87, which demodulates the signal using this carrier signal E.

The ex-OR circuit 87 produces an output signal representing differential data. If necessary, the signal F may be inputted to a low-pass filter to remove so-called "spikes" and other noise, and then compared with a suitable threshold level in a comparator circuit in order to have its waveform shaped.

Thus, regardless of the fact that the modulated carrier signal is phase-shifted in dependence upon the differential data, it is possible to obtain the carrier signal E of the same frequency synchronized to the leading or trailing edge of the modulated carrier signal A. This assures that the carrier signal E will always be correctly demodulated by the ex-OR circuit 87.

As many apparently widely different embodiments of the present invention can be made without departing from the spirit and scope thereof, it is to be understood that the invention is not limited to the specific embodiments thereof except as defined in the appended claims.

What is claimed is:

1. A modulating/demodulating circuit for multiplexed recording/playback of data and a video signal having a horizontal synchronizing signal to/from a magnetic storage medium in a magnetic recording/playback system, comprising:
    carrier signal generating means for generating a carrier signal for multiplexed recording/playback of data, and
    an exclusive-OR circuit, receiving a signal representing data to be recorded on the magnetic storage medium, or a data signal read from a magnetic storage medium and said carrier signal,
    said carrier signal generating means including,
        a counter for counting a high frequency clock signal to produce said carrier signal,
        and counter reset means, synchronized to said horizontal synchronizing signal, for generating a reset signal applied to said counter to reset the count produced thereby, said carrier signal produced by said counter being thereby synchronized to said horizontal synchronizing signal.

2. The modulating circuit according to claim 1, wherein a band-pass filter for passing a frequency band of the carrier signal is connected to the output side of said exclusive-OR circuit.

3. The demodulating circuit according to claim 1, further comprising a band-pass filter which passes a frequency band of the carrier signal for removing a video signal from a read signal of the magnetic storage medium and extracting the data read signal, an output signal from said filter being applied to said exclusive-OR circuit.

4. The modulating circuit according to claim 1, further comprising a synchronous latch circuit responsive to a signal synchronized to said horizontal synchronizing signal for latching the signal representing the data to be recorded, and for applying the signal to said exclusive-OR circuit.

5. The demodulating circuit according to claim 1, wherein said counter reset means is synchronized to the data read signal for generating the reset signal as a reset pulse at substantially an intermediate point of a horizontal scanning interval.

6. The modulating/demodulating circuit according to claim 1, further comprising:
  a first exclusive-OR circuit for modulating the signal representing the data to be recorded;
  a second exclusive-OR circuit for demodulating the data read signal from the magnetic storage medium; and
  a carrier changeover circuit for selectively supplying the carrier signal to said first and second exclusive-OR circuits.

* * * * *

UNITED STATES PATENT AND TRADEMARK OFFICE
CERTIFICATE OF CORRECTION

PATENT NO. : 4,907,092
DATED : March 6, 1990
INVENTOR(S) : Yoshiki IWASE et al.

It is certified that error appears in the above-identified patent and that said Letters Patent is hereby corrected as shown below:

On the title page:

Correct the Inventors' residence on first page of Letters Patent to read as follows:

--Izumi Miyake, Kiyotaka Kaneko, both of Kanagawa--

Signed and Sealed this

Twenty-first Day of May, 1991

Attest:

HARRY F. MANBECK, JR.

Attesting Officer     Commissioner of Patents and Trademarks